United States Patent [19]

Lotsch et al.

[11] 4,401,815

[45] Aug. 30, 1983

[54] ISOINDOLINE COLORANTS

[75] Inventors: Wolfgang Lotsch, Beindersheim; Reinhard Kemper, Heidelberg; Gustav Bock, Neustadt; Wolfgang Elser, Wachenheim, all of Fed. Rep. of Germany

[73] Assignee: BASF Aktiengesellschaft, Rheinland-Pfalz, Fed. Rep. of Germany

[21] Appl. No.: 231,047

[22] Filed: Feb. 3, 1981

[30] Foreign Application Priority Data

Feb. 27, 1980 [DE] Fed. Rep. of Germany ....... 3007301

[51] Int. Cl.³ ............................................. C09B 57/04
[52] U.S. Cl. .................................... 544/300; 106/23; 106/288 Q
[58] Field of Search ........................................ 544/300

[56] References Cited

U.S. PATENT DOCUMENTS 3,794,659  2/1974  Leister et al. ...................... 544/284
3,991,054 11/1976  Bock et al. ......................... 544/300

FOREIGN PATENT DOCUMENTS 2814526 12/1978  Fed. Rep. of Germany .
2135259  5/1972  France .
2386588  4/1978  France .
2412589 12/1978  France .
2013230A 8/1979  United Kingdom .

*Primary Examiner*—Paul M. Coughlan, Jr.

*Attorney, Agent, or Firm*—Oblon, Fisher, Spivak, McClelland & Maier

[57] ABSTRACT

Novel isoindoline colorants of the formula

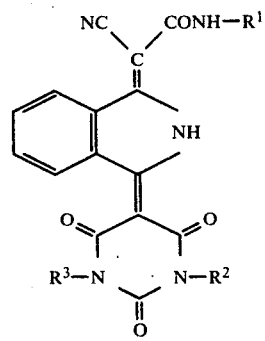

where $R^1$ is phenyl or 1-naphthyl, which are unsubstituted or substituted by groups which do not confer solubility, $R^2$ and $R^3$, independently of one another, are $C_1$-$C_4$-alkyl or benzyl or $R^3$ is hydrogen and $R^2$ is $C_1$-$C_4$-alkyl or benzyl, or is phenyl or 1-naphthyl which are unsubstituted or substituted by groups which do not confer solubility, $R^1$ and $R^2$ being identical or different, and the use of these colorants.

In surface coatings, printing inks and plastics, the products give brilliant yellow to red colorations, which exhibit very good lightfastness and fastness to weathering, and good fastness to overcoating.

8 Claims, No Drawings

ISOINDOLINE COLORANTS

The invention relates to novel isoindoline colorants. The novel colorants have the general formula I

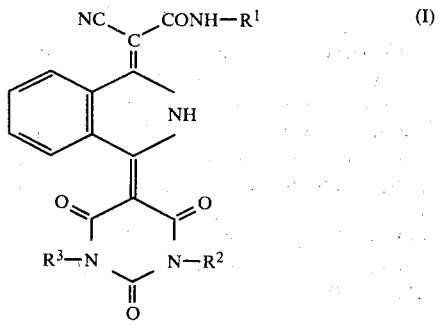

where $R^1$ is phenyl or 1-naphthyl, which are unsubstituted or substituted by groups which do not confer solubility, $R^2$ and $R^3$, independently of one another, are $C_1$–$C_4$-alkyl or benzyl or $R^3$ is hydrogen and $R^2$ is $C_1$–$C_4$-alkyl or benzyl, or is phenyl or 1-naphthyl which are unsubstituted or substituted by groups which do not confer solubility, $R^1$ and $R^2$ being identical or different.

In surface coatings, plastics and printing inks, the novel products of the formula I give yellow to red brilliant colorations which exhibit high tinctorial strength, very good lightfastness and fastness to weathering, and good fasteners to overcoating.

The novel colorants (I) surpass those described in German Laid-Open Application DOS No. 2,814,526 in that, when used in full-shade colorations in finishes and plastics, the novel products show little or no tendency to brownish discoloration in light.

Furthermore, the colorants (I) are as a rule superior, in tinctorial strength and purity of hue, to the colorants of the closest prior art.

Because of their hues, the novel colorants may be used as substitutes for pigments containing heavy metals, such as lead chromate and lead molybdate.

For the purposes of the invention, substituents which do not confer solubility are those which do not cause the colorant to be soluble in water or in organic solvents. Examples of such substituents are halogen, alkyl and alkoxy each of 1 to 6 carbon atoms, nitro, trifluoromethyl, carbamyl, ureido, sulfamyl and cyano; alkoxycarbonyl, alkanoyl, N-alkylcarbamyl, N-alkylureido and alkanoylamino, each of a total of 2 to 6 carbon atoms; alkylsulfonyl and alkylsulfamyl, each of 1 to 6 carbon atoms; aryloxycarbonyl, aroyl, aroylamino, arylsulfonyl, N-arylcarbamyl, N-arylsulfamyl, aryloxy, aryl, N-arylureido and arylazo, aryl being preferably phenyl, and fused 5-membered and 6-membered heterorings containing a

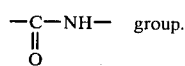

group.

Preferred substituents which do not confer solubility are chlorine, bromine, $C_1$–$C_4$-alkyl, $C_1$–$C_4$-alkoxy and phenoxy. Amongst these, chlorine, bromine, $C_1$–$C_4$-alkyl, especially methyl and ethyl, methoxy and ethoxy are particularly preferred.

Where $R^2$ and/or $R^3$ is $C_1$–$C_4$-alkyl, preferred meanings are methyl and ethyl.

Amongst the compounds of the formula I, the following are preferred for tinctorial reasons:

(1) Colorants of the formula I, wherein $R^1$ is phenyl which is unsubstituted or substituted by groups which do not confer solubility, and $R^2$ and $R^3$ are methyl.

(2) Colorants (I), wherein $R^1$ is

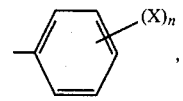

$R^3$ is hydrogen, $R^2$ is phenyl or 1-naphthyl, each of which is unsubstituted or substituted by groups which do not confer solubility, X is hydrogen, $C_1$–$C_4$-alkyl, chlorine or bromine, n is 1, 2 or 3 and, if n is 2 or 3, the radicals X may be identical or different.

(3) Colorants (I), wherein $R^1$ is

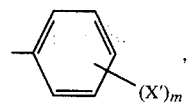

$R^3$ is hydrogen, $R^2$ is $C_1$–$C_4$-alkyl or benzyl, X' is chlorine or methyl and m is 1, 2 or 3, and if m is 2 or 3 the radicals may be identical or different.

(4) Colorants of the formula (I), wherein $R^1$ is

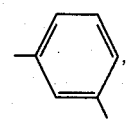

$R^3$ is hydrogen, $R^2$ is

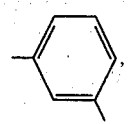

Z is hydrogen if Y is chlorine and Z is methyl if Y is hydrogen.

(5) Colorants of the formula (I), wherein $R^1$ is

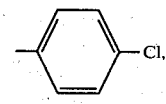

$R^3$ is hydrogen and $R^2$ is

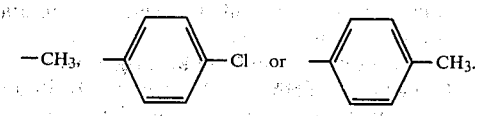

The novel colorants are obtained by condensing diiminoisoindoline

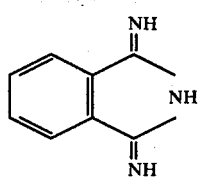 (II)

in a conventional manner with one mole of a compound

NC—CH$_2$—CONH-R$^1$ (III)

and then condensing the semi-condensation product obtained, of the formula

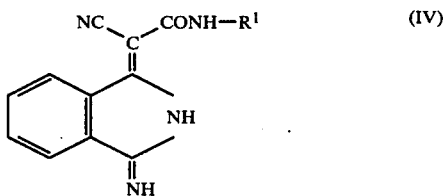 (IV)

with one mole of the compound

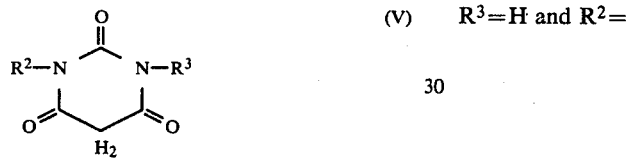 (V)

where R$^1$, R$^2$ and R$^3$ have the above meanings.

The condensation of the diiminoisoindoline with the cyanomethylene-active compound of the formula III is preferably carried out in water or in an organic solvent or diluent, for example a aliphatic alcohol of 1 to 4 carbon atoms, eg. methanol, ethanol, isopropanol or butanol, a glycol or glycol-ether, or an open-chain or cyclic amide, eg. dimethylformamide, dimethylacetamide or N-methylpyrrolidone, or in a mixture of the above solvents. The use of a slight excess of diiminoisoindoline can be advantageous. The amount of solvent or diluent is, per se, not critical and is chosen to ensure the stirrability and mixability of the reaction batch. The reaction is as a rule carried out at below 100° C.

The condensation of the semi-condensation product of the formula (IV) with the barbituric acid of the formula (V) is carried out in one of the above solvents or, preferably, in an aliphatic monocarboxylic acid, eg. acetic acid or propionic acid, or in a mixture of a carboxylic acid with dimethylformamide, at from 50° to 150° C.

The semi-condensation products of the formula (IV), and the pigments of the formula (I), precipitate from a hot reaction mixture and can be isolated in a pure form by filtering off and, where necessary, washing with an organic solvent.

By conducting the reaction appropriately, it is also possible to effect both steps in one reaction vessel, without intermediate isolation of the semi-condensation products of the formula (IV).

The crude products obtained can in general be employed as pigments. They can however also be converted, by conventional finishing methods, into the optimum pigmentary form for the envisaged end use. In some cases, such finishing gives exceptionally valuable pigmentary forms. There are also some cases where tinctorially particularly useful pigmentary forms may be obtained direct, from the method of preparation, by observing special reaction conditions.

The Examples which follow illustrate the invention. Parts and percentages are by weight.

EXAMPLE 1

30 parts of 1-[cyano-N-(3'-methylphenyl)-carbamylmethylene]-3-iminoisoindoline and 21 parts of N-phenylbarbituric acid are introduced, with vigorous stirring, into 1,000 parts of a 95:5 mixture of glacial acetic acid and dimethylformamide, and the reaction mixture is boiled for 3 hours. After cooling, the reaction product is filtered off, washed with glacial acetic acid and methanol, and dried.

Yield: 46 parts of the pigment of the formula I, wherein R$^1$=

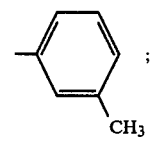;

R$^3$=H and R$^2$=

.

The product may be employed direct for pigmenting paints and plastics. The colorations obtained have a pure red hue, very good lightfastness and fastness to weathering, and good fastness to overcoating.

EXAMPLES 2 to 28

The procedure described in Example 1 is followed, but the semi-condensation products of the formula IV, characterized by the radical R$^1$, are reacted with the arylbarbituric acids characterized by the radical R$^2$. The corresponding compounds of the formula I are obtained, and these, in coatings, give colorations which have good properties similar to those in Example 1, and show the hue indicated in the right-hand column.

| Example | R$^1$ | R$^2$ | R$^3$ | Hue |
|---------|-------|-------|-------|------|
| 2 |  |  | H | orange |
| 3 |  | —CH$_3$ | H | orange |
| 4 |  | —Cl | H | orange |
| 5 |  | —OCH$_3$ | H | orange |
| 6 |  |  | H | red |

| Example | R¹ | R² | R³ | Hue |
|---|---|---|---|---|
| 7 | 4-Cl-C₆H₄- | 4-Cl-C₆H₄- | H | orange |
| 8 | 4-Cl-C₆H₄- | 4-CH₃-C₆H₄- | H | orange |
| 9 | 4-Cl-C₆H₄- | 4-OC₂H₅-C₆H₄- | H | orange |
| 10 | 4-Cl-C₆H₄- | 4-OCH₃-C₆H₄- | H | orange |
| 11 | 4-Cl-C₆H₄- | 4-Br-C₆H₄- | H | orange |
| 12 | 4-Cl-C₆H₄- | 3-Cl-C₆H₄- | H | red |
| 13 | 4-Cl-C₆H₄- | 3-CH₃-C₆H₄- | H | orange |
| 14 | 3-Cl-C₆H₄- | C₆H₅- | H | orange |
| 15 | 4-CH₃-C₆H₄- | C₆H₅- | H | red |
| 16 | 4-CH₃-C₆H₄- | 4-CH₃-C₆H₄- | H | red |
| 17 | 2-CH₃-C₆H₄- | C₆H₅- | H | red |
| 18 | 2-CH₃-C₆H₄- | 4-CH₃-C₆H₄- | H | orange |
| 19 | 3-CH₃-C₆H₄- | 4-OCH₃-C₆H₄- | H | red |
| 20 | 3,4-(CH₃)₂-C₆H₃- | 4-CH₃-C₆H₄- | H | red |
| 21 | 3-CH₃-C₆H₄- | 3-Cl-C₆H₄- | H | red |
| 22 | 3,4-(CH₃)₂-C₆H₃- | 4-Cl-C₆H₄- | H | brown |
| 23 | 3,5-(CH₃)₂-C₆H₃- | 4-CH₃-C₆H₄- | H | reddish brown |
| 24 | 4-OCH₃-C₆H₄- | 4-CH₃-C₆H₄- | H | brownish red |
| 25 | 2-Cl-4-CH₃-C₆H₃- | C₆H₅- | H | orange |
| 26 | 4-Cl-C₆H₄- | C₆H₅- | H | orange |
| 27 | C₆H₅- | 2-naphthyl | H | orange |
| 28 | 3-CH₃-C₆H₄- | 2-naphthyl | H | orange |

EXAMPLE 29

29 parts of 1-[-cyano-N-(4'-chlorophenyl)-carbamyl-methylene]-3-iminoisoindoline and 17 parts of the sodium salt of N-methylbarbituric acid, in 400 parts of dimethylformamide and 100 parts of formic acid, are stirred for 4 hours at 100° C. When the mixture has cooled it is filtered and the product is washed with dimethylformamide and methanol, and dried. 32 parts of the pigment of the formula I, wherein R¹=

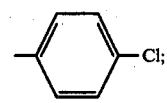

R³=and R²=CH₃ are obtained.

The product can be used direct in paints and plastics. The colorations obtained are distinguished by a pure orange hue, very good lightfastness and fastness to weathering, and good fastness to plasticizers.

EXAMPLES 30 to 38

The procedure described in Example 1 or 29 is followed, but the semi-condensation products of the formula IV, characterized by the radical R¹, are reacted with the N-alkylbarbituric acids characterized by the radical R². The corresponding compounds of the formula I are obtained, and these, in coatings, give colorations which have good properties similar to those in Example 1, and show the hue indicated in the right-hand column.

| Example | R¹ | R² | R³ | Hue |
|---|---|---|---|---|
| 30 | 4-Cl-C₆H₄- | —C₂H₅ | H | orange |

-continued

| Example | R¹ | R² | R³ | Hue |
|---|---|---|---|---|
| 31 | 2-Cl, 4-CH₃-phenyl | —CH₃ | H | orange |
| 32 | 3-CH₃-phenyl | —CH₃ | H | orange |
| 33 | 3-Cl-phenyl | —CH₃ | H | red |
| 34 | 2,4-di-Cl-phenyl | —CH₃ | H | yellow |
| 35 | 2-CH₃-phenyl | —CH₃ | H | orange |
| 36 | 3,4-di-CH₃-phenyl | —CH₃ | H | orange |
| 37 | 4-Cl-phenyl | CH₂—phenyl | H | orange |
| 38 | 3-Cl-phenyl | —C₂H₅ | H | orange |

EXAMPLE 39

34 parts of 1-[cyano-N-(4'-methyl-3'-chlorophenyl)-carbamyl-methylene]-3-iminoisoindoline and 16 parts of N,N'-dimethylbarbituric acid in 700 parts of glacial acetic acid are stirred for 4 hours at 85° C. After cooling, the product is filtered off, washed with glacial acetic acid and methanol, and dried. 42 parts of the pigment of the formula I, wherein R¹=

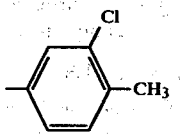

and R²=R³=—CH₃, are obtained.

The product can be used direct, in this form, in paints and plastics. The colorations obtained are distinguished by a pure, orange hue and very good lightfastness and fastness to weathering.

If the same colorant is synthesized by prior art methods, at above 100° C., it is obtained in a tinctorially less useful brownish red form.

EXAMPLES 40 to 43

The procedure described in Example 39 is followed, but the semi-condensation products of the formula IV, characterized by the radical R¹, are reacted with the N,N'-dialkylbarbituric acids characterized by the radicals R² and R³. The corresponding compounds of the formula I are obtained, and these, in coatings and printing inks, give colorations which have good properties similar to those in Example 1, and show the hue indicated in the right-hand column.

| Example | R¹ | R² | R³ | Hue |
|---|---|---|---|---|
| 40 | 4-Cl-phenyl | —CH₃ | —CH₃ | orange |
| 41 | phenyl | —CH₃ | —CH₃ | orange |
| 42 | 2,4-di-OCH₃-5-Cl-phenyl | —CH₃ | —CH₃ | brown |
| 43 | 3-Cl-phenyl | —CH₃ | —CH₃ | orange |
| 44 | 4-OCH₃-phenyl | 4-Cl-phenyl | —H | brown |

EXAMPLE 45 (USE EXAMPLE)

(a) Finish 10 parts of the colorant obtained as described in Example 1 and 95 parts of a baking finish mixture, which contains 70% of a coconut alkyd resin (60% strength solution in xylene) and 30% of melamine resin (about 55% strength solution in butanol/xylene) are ground in an attrition mill. After application to a substrate, and baking for 30 minutes at 120° C., red full-shade hues having good lightfastness and fastness to overspraying are obtained. If titanium dioxide is admixed, red white reductions are obtained.

If the colorants described in Examples 2 to 44 are used, coatings in similar orange to red hues, and having similar properties, are obtained.

(b) Plastic 0.5 part of the colorant obtained as described in Example 1 is applied, by tumbling, to 100 parts of polystyrene granules (standard grade). The surface-colored granules are homogenized by extrusion at 190°–195° C. Red extrudates having a very lightfast coloration are obtained.

If a mixture of 0.5 part of colorant and 1 part of titanium dioxide is employed, an opaque red coloration is obtained.

The pigments obtained according to Examples 2 to 44 give similar colorations.

(c) Printing ink 8 parts of the pigment obtained as described in Example 1, 40 parts of phenol/formaldehyde-modified rosin and 55–65 parts of toluene are thoroughly mixed in a disperser. A red toluene-based gravure ink is obtained. This ink gives very lightfast prints.

Similar results are obtained on using the colorants from Examples 2 to 44.

We claim:

1. An isoindoline colorant of the formula

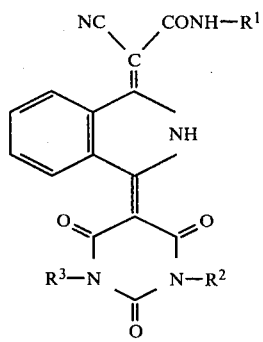

where $R^1$ is phenyl which is mono- or disubstituted by chlorine, or bromine, $R^3$ is hydrogen, and $R^2$ is $C_1$–$C_4$-alkyl; or $R^1$ is phenyl, naphthyl or a phenyl or napthyl group which is substituted by chlorine, bromine, $C_1$–$C_4$-alkyl, $C_1$–$C_4$-alkoxy or phenoxy, $R^3$ is hydrogen, and $R^2$ is phenyl, naphthyl or a phenyl or napthyl group which is substituted by chlorine, bromine, $C_1$–$C_4$-alkyl, $C_1$–$C_4$-alkoxy or phenoxy, wherein the number of substituents in $R^1$ and $R^2$ is 1, 2 or 3 with the proviso that if there are 2 or 3 substitutents, said substituents may be identical or different.

2. An isoindoline colorant as claimed in claim 1, wherein $R^1$ is

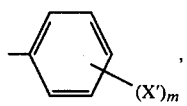

$R^3$ is hydrogen, $R^2$ is $C_1$–$C_4$-alkyl or benzyl, X′ is chlorine and m is 1, 2 or 3, and if m > 1 the radicals X′ may be identical or different.

3. An isoindoline colorant as claimed in claim 2, wherein $R^2$ is methyl or ethyl, X′ is chlorine or methyl and m is 1 or 2, with the proviso that if m is 2 the radicals X′ may be identical or different.

4. An isoindoline colorant of the formula

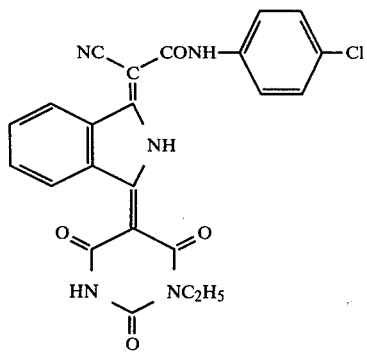

5. An isoindoline colorant of the formula

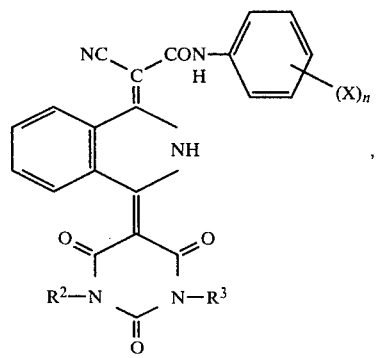

where $R^3$ is hydrogen, $R^2$ is phenyl or 1-naphthyl, each of which is unsubstituted or substituted by groups which do not confer solubility, X is hydrogen, $C_1$–$C_4$-alkyl, chlorine or bromine and n is 1, 2 or 3, and, if n > 1, the radicals X may be identical or different.

6. An isoindoline colorant as claimed in claim 5, wherein the phenyl or 1-naphthyl radical $R^2$ is substituted by chlorine, bromine, $C_1$–$C_4$-alkyl, $C_1$–$C_4$-alkoxy or phenoxy as groups which do not confer solubility and the number of substituents is 1, 2 or 3, and, if 2 or 3 substituents are present, the substituents may be identical or different.

7. An isoindoline colorant of the formula

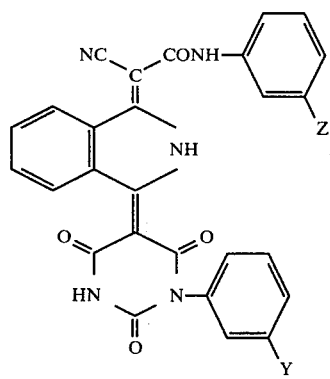

where Z is hydrogen if Y is chlorine, or Z is methyl if Y is hydrogen.

8. The isoindoline colorant of the formula

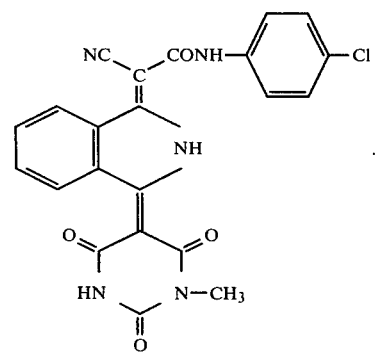

where $R^1$ is phenyl which is unsubstituted or substituted by groups which do not confer solubility, and $R^1$ and $R^2$ are methyl.

* * * * *